United States Patent Office 3,078,981
Patented Feb. 26, 1963

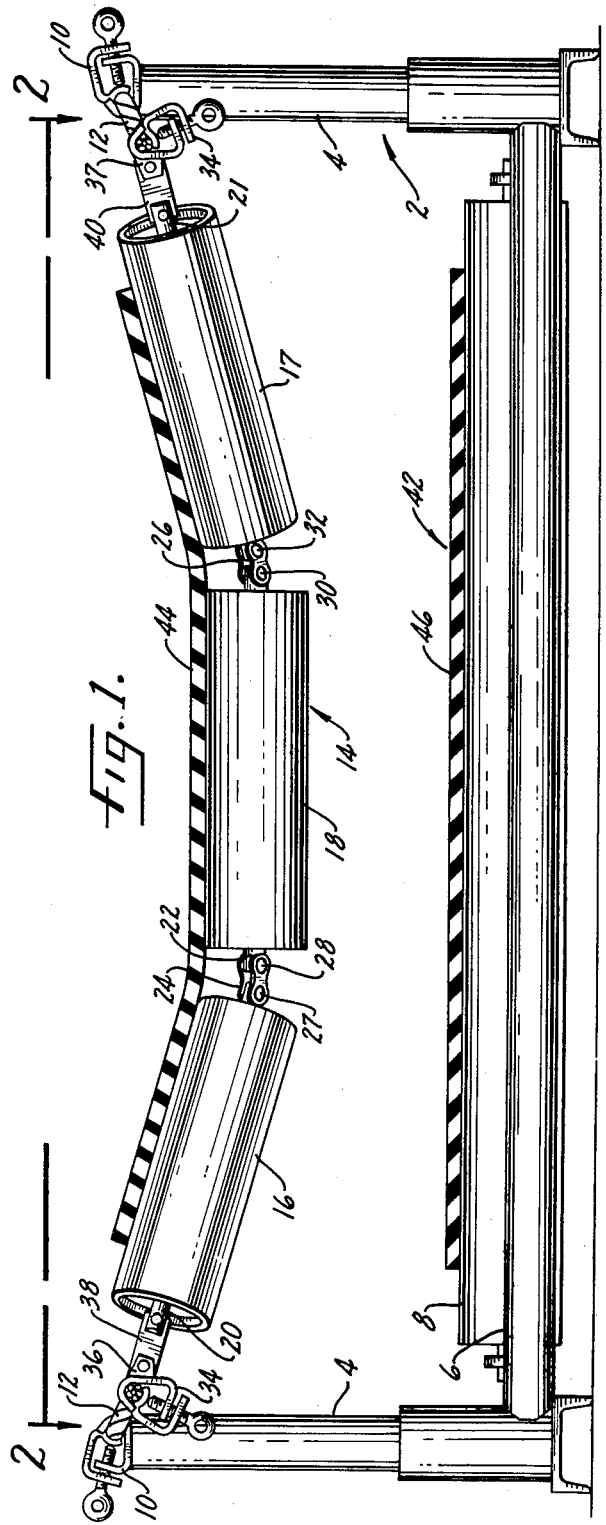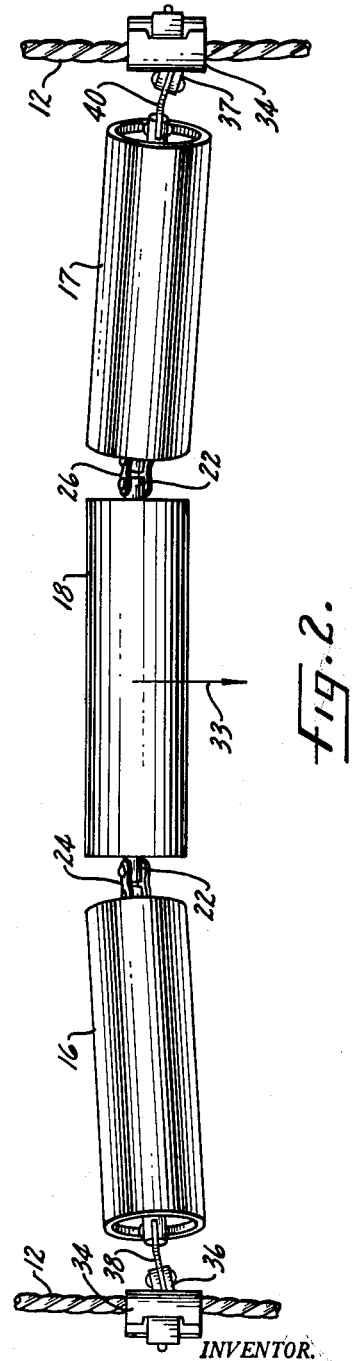

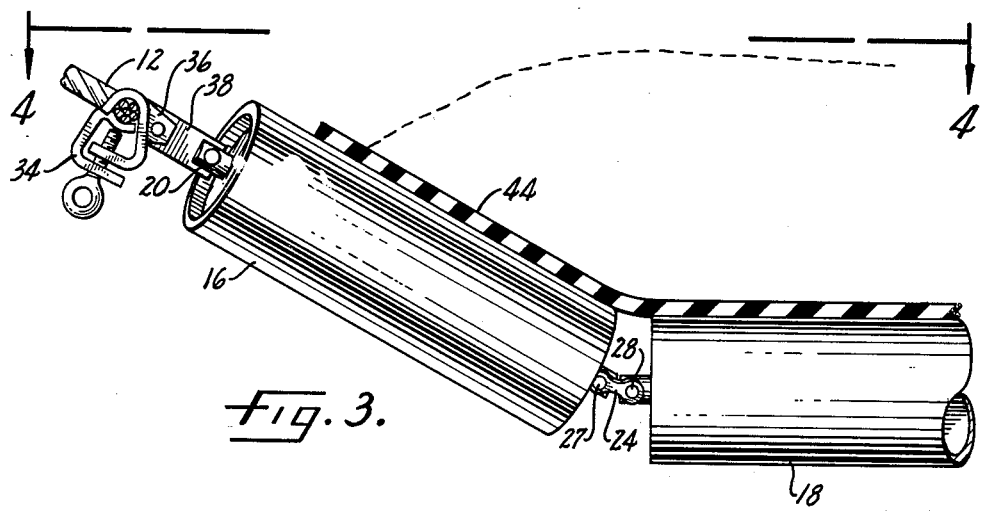
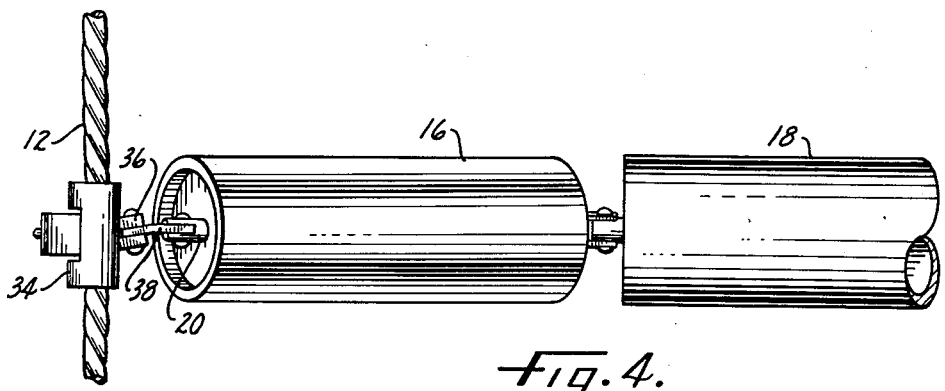
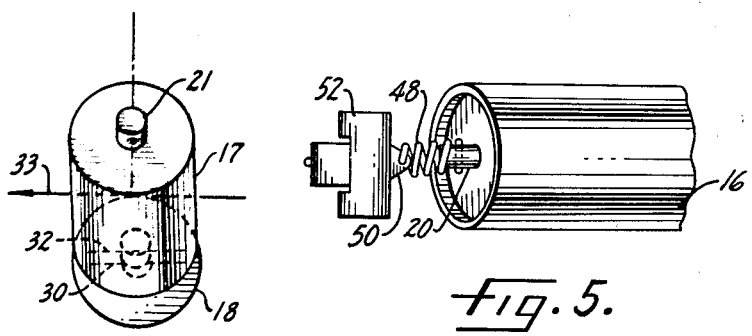
INVENTOR.
Thomas R. Davis,
BY Parker & Carter
Attorneys.

3,078,981
LOAD RESPONSIVE BELT TRAINING
TROUGHING IDLER ASSEMBLY
Thomas R. Davis, McHenry, Ill., assignor to Goodman Manufacturing Company, Chicago, Ill., a corporation of Illinois
Filed Apr. 5, 1960, Ser. No. 20,041
1 Claim. (Cl. 198—192)

This invention relates in general to rope side frame conveyors and more specifically to an improved troughing idler assembly for such a conveyor wherein a variable training effect is exerted on the belt as a function of the amount of load.

Rope side frame conveyors are usually comprised of a series of spaced support standards carrying ropes, the ropes supporting troughing idler assemblies. The idler assemblies are spaced along the path length of the conveyor. One widely used type of troughing idler assembly consists of a center roller and two wing rollers, pivotally connected by chain links. The outermost or wing rollers are usually connected to the rope sideframes of the conveyor by links similar to the links connecting the center roller to the wing rollers. This flexible assembly then troughs as a function of the weight of the load being carried on the conveyor belt.

As the conveyor belt passes over the idler assembly, the frictional effect of the travelling belt on the rollers normally tends to drag the center roller downstream relative to the direction of belt travel and force the wing rollers into a backwardly canted or swept-wing configuration relative to the center roller. Normally, each roller exerts a force upon the belt surface which it contacts in a direction perpendicular to the axis of the roller. Consequently, each backwardly canted wing roller, as it rotates, is tending to force the belt surface contacting it outwardly relative to the center roller. As a result, if one wing roller initially contacts more belt width than the other wing roller it will exert a greater lateral force on the belt than the other wing roller and will tend to drag more belt onto its surface. A detraining effect results and the entire system runs awry.

The detraining effect produced by one wing roller contacting more belt surface than the other is much less pronounced in belts carrying substantially heavy loads of material than it is in a belt carrying a relatively light load. This is due to the fact that the greatest training effect on the belt is exerted by the center roller. As the load increases the belt flexes and the amount of belt surface contacting the center roller increases somewhat proportionately while the belt surface contacting the wing rollers is not increased to quite such an extent. This effect, coupled with the fact that the center of gravity of the load is approximately over the center of the belt and will tend to ride in the lowest position possible due to the force of gravity, reduces the problem of training a heavily loaded belt. As opposed to this, an empty or lightly loaded belt often makes very little contact with the center roller and accordingly, the training effect of the wing rollers predominates. Thus an empty belt travelling at relatively high speeds is often easily detrained should the belt move off center for one or more reasons.

A slight misalignment of the standards supporting the ropes, or misalignment of the idler assemblies on the ropes, are two of the common causes for movement of a travelling conveyor belt off center relative to the troughing idler assemblies. When such a condition exists initially, the result is that an empty belt will move laterally of the direction of belt travel on the backwardly canted wing rollers. In an extreme case the belt may even pass over one end of an idler assembly.

A number of means have been employed to provide satisfactory conveyor belt training. One of these is the use of vertically extending side rollers mounted adjacent the edges of the conveyor belt. The belt, in moving from center alignment on the idler assembly, contacts the vertically mounted side rollers and is maintained in proper relationship with the idler assemblies by these side rollers. This construction is very effective in operation but relatively expensive and provides maintenance problems due to the greater number of moving parts in the conveyor assembly. Another means of providing satisfactory conveyor belt training is shown in my co-pending application entitled "Belt Training Troughing Idler Assembly," Serial No. 20,048, filed April 5, 1960. In the construction of that application the wing rollers are maintained in a forwardly canted relationship in the direction of belt travel relative to the center roller. Consequently, the wing rollers tend to direct that belt surface which they contact towards the center roller and a training effect is exerted. In the construction of that application the degree of forward cant of the wing rollers is generally fixed though it tends to slightly increase with increased loads. With a heavily loaded belt travelling on forwardly canted wing rollers, increased wear is effected on the belt due to the scuffing of the outer surfaces of the conveyor belt which are contacting the wing rolls at a slight angle relative to the rotational plane of the wing rollers.

Accordingly, it is the primary object of this invention to provide a simple and economical means for training conveyor belts on rope side frame conveyors.

It is a further object to provide a troughing idler assembly incorporating structure which is easily pre-set to maintain proper belt training on this type of conveyor.

Still another object is to provide a troughing idler assembly in which the wing rollers are pre-set in a forwardly canted attitude relative to the direction of conveyor belt travel.

Still another object is to provide a troughing idler assembly wherein the amount of forward cant of the wing rollers is variable as a function of the load carried by the conveyor belt.

These and other objects will become apparent in the following specifications and claim wherein like reference numerals identify like parts throughout.

The invention is illustrated more or less diagrammatically in the following drawings wherein:

FIGURE 1 is a section through a rope side frame conveyor illustrating one embodiment of this invention, FIGURE 2 is a plan view of the idler assembly shown in FIGURE 1 taken along line 2—2 of FIGURE 1 with parts omitted for clarity, FIGURE 3 is a partial front elevation showing a portion of the idler assembly and its supported conveyor belt carrying a load of material, FIGURE 4 is a partial plan view of the idler assembly shown in FIGURE 3 taken through line 4—4 of FIGURE 3 with the conveyor belt and load omitted, FIGURE 5 is a plan view in detail of one end of a wing roller showing a second embodiment of this invention, and FIGURE 6 is a schematic end view of the idler assembly of FIGURE 4 showing the relationship between the pivotal axes of the connecting links and the direction of belt travel.

A portion of a rope side frame conveyor is shown in FIGURE 1. Shown generally at 2 therein is a support stand for the rope side frame conveyor, the support stand being typical of supports spaced regularly to carry the ropes of the conveyor. The support stand 2 is comprised of telescoping members 4 connected by a crossbar 6. Carried by the crossbar 6 is return roller 8. The support stands each carry clamps 10 which engage and hold ropes 12 of the rope side frame conveyor.

Supported from the ropes 12 at substantially regularly spaced intervals are troughing idler assemblies 14. These troughing idler assemblies include wing rollers 16 and 17 and center roller 18. The rollers are mounted for rotation about dead shafts 20, 21 and 22, respectively. Link 24 connects dead shaft 20 to dead shaft 22 and link 26 connects dead shaft 21 to dead shaft 22. Link 24 is connected to shaft 20 and 22 for pivotal movement about axes 27 and 28 while link 26 is connected to dead shaft 21 and 22 for pivotal movement about axes 30 and 32. As seen in FIGURE 1, in an unloaded condition the axes 27, 28, 30 and 32 are tilted substantially downwardly in the direction of conveyor belt travel. The direction of conveyor belt travel is shown generally at 33 in FIGURES 2 and 6.

Secured to the side ropes 12 by clamps 34 are inwardly extending ears 36 and 37. The ears extend rearwardly at an angle of approximately five to seven degrees to a plane perpendicular to the direction of conveyor belt travel. This is best seen in FIGURE 2 in a no load condition.

In one embodiment of this invention, yieldable members, in this instance resilient strips of spring steel or the like 38 and 40, connect the extending ears 36 and 37 with the ends of dead shafts 20 and 21. The strips are fixedly connected to ears 36 and 37 and corresponding dead shafts 20 and 21 by rivets or bolts or the like.

A conveyor belt is shown generally at 42 and includes a carrying reach 44 and a return reach 46. The carrying reach 44 is shown supported by the troughing idler assembly for traveling in the direction 33, and the return reach 46 is carried by the return roller 8.

A second embodiment of this invention is shown in FIGURE 5. A coil torsion spring 48 is fixedly secured to the outer end of dead shaft 20 and to ear 50. Ear 50 extends inwardly from a corresponding clamp 52 secured to a rope of the rope side frame conveyor. An identical spring would, of course, connect dead shaft 21 with a corresponding rope.

Throughout the specification and claim the terms "backward" and "backwardly" describe a canted condition of the wing rollers in which the outer ends of the wing rollers lie upstream of the inner ends with respect to the direction of belt travel while "forward" and "forwardly" describe a condition wherein these outer ends lie downstream of the inner ends.

The use, operation and function of this invention are as follows:

In FIGURES 1 and 2, the first embodiment of this invention is shown in a condition wherein no load is carried by the conveyor belt 42. The wing rollers 16 and 17 are pre-set in a forwardly canted attitude relative to the direction of conveyor belt travel. Resilient strips 38 and 40 fixedly secured to rearwardly extending ears 36 and 37 tend to maintain the wing rollers 16 and 17 in this pre-set attitude. The links 24 and 26 pivotally connect the wing rollers 16 and 17 to the center roller 18 in such a manner that their pivotal axes 27, 28, 30 and 32 are tilted substantially downwardly relative to the direction of conveyor belt travel. As the conveying reach 44 of the conveyor belt travels in a no load condition over the rollers, it tends to drag them downstream into a swept-wing configuration. This is prevented by the attitude of links 24 and 26 which will not permit dead shafts 20 and 21 to swing forwardly in the direction of belt travel. Consequently, a substantially high degree of forward cant of wing rollers 16 and 17 is maintained during a no load condition on the conveyor belt, although the play in the link connections between the dead shafts allows some bending of strips 38 and 40, as seen in FIGURE 2. This can be compensated for by pre-setting the wing rollers at a slightly greater degree of forward cant than desired in no load operation.

As a result of maintaining the wing rollers 16 and 17 canted forwardly to a substantial degree in the direction of belt travel during a no load condition, they have a maximum tendency to direct that portion of the belt which contacts these rollers downwardly towards the center roller 18. Since it is known that the training effect exerted on the belt by rollers 16 and 17 is proportionally dependent upon the angle of cant of the wing rollers plus the amount of belt area contacting each of these rollers, a compensating centering effect will be exerted by the wing rollers on the belt as long as an equal width of the conveyor belt remains in contact with each wing roller. If the belt should ride further up on one wing roller and correspondingly downward on the opposite wing roller, that wing roller which contacts more belt will have more of a centering effect and will tend to train the belt back to center relationship on the troughing idler assembly.

As the load increases on the belt, resilient strips 38 and 40 undergo torsional stress and consequently twist, as is best shown in FIGURE 4. As the resilient strips 38 and 40 twist, the idler assembly swings forwardly about ears 36 and 37. Increased troughing results and the angle of cant of the wing rollers 16 and 17 decreases until the point is reached at maximum load wherein little or no canted effect is retained and the links 24 and 26 assume an attitude wherein their axes are in substantial alignment with the direction of conveyor belt travel. This is best seen in FIGURES 3 and 4.

As a result of the decrease in forward cant of the wing rollers 16 and 17, a decreased training effect is exerted on the conveyor belt. This in turn results in less scuffing of the heavily loaded outer surfaces of the conveyor belt on the wing rollers. The belt, however, does not detrain since the heavily loaded belt is properly trained to a great extent by the center roller 18.

The second embodiment of the invention, shown in FIGURE 5, employs coil springs 48 in lieu of the resilient metal strips 38 and 40 shown in the embodiment of FIGURES 1-4. The coil springs react in substantially the same manner as the resilient strips hereinbefore described. As seen in FIGURE 5, it is not necessary that the inwardly extending ears 50 of this embodiment extend backwardly at an angle oblique to the direction of conveyor belt travel since the springs 48 easily bend to allow presetting of the canted effect of the wing rollers 16 and 17. This is because the springs 48 are highly resistant only to torsional stress unlike the steel strips. Otherwise, springs 48 react in the same manner as do the strips 38 and 40 undergoing torsional stress and consequently twisting deformation as the load increases on the conveyor belt. Where very heavy loads are being carried by the conveyor belt an expansive swivel connection, in addition to springs 48, is sometimes used in connecting dead shaft 20 with ear 50. However, the swivel would be employed only as an over load safety measure. It is anticipated, of course, that dead shaft 21 will be connected to corresponding side rope 12 by another torsion coil spring in the same manner as dead shaft 20.

On the removal of the load from the conveyor belt, the resilient strips or coil springs automatically return the wing rollers 16 and 17 to a forwardly canted attitude relative to the direction of conveyor belt travel. As a result of this construction, a proper training effect on a conveyor belt carrying a wide range of loads is maintained while in conjunction therewith a minimum of wear results from excessive scuffing of a loaded belt on the wing rollers.

It is intended that the description of this invention be illustrative only and not definitive and that the invention be limited only by the scope of the appended claim.

I claim:

A belt training troughing idler assembly for a belt conveyor,
    said troughing idler assembly being effective to exert a variable belt training effect on a conveyor belt passing thereover ranging from a maximum effect at no load to a minimum effect at full load, said troughing idler assembly including, in combination,
a roller assembly comprising
a center roller and
at least a pair of wing rollers flanking the center roller,
pivotal connecting means connecting the center roller to the flanking wing rollers,
said pivotal connecting means having pivot axes which are downwardly, forwardly inclined with respect to the direction of belt travel of a conveyor belt passing over the troughing idler assembly when the conveyor carries less than a full load,
connecting assemblies for connecting the roller assembly, at its ends, to a pair of spaced sideframes which enables the training angle of the wing rollers to change with changing load, each of said connecting assemblies including
a clamp engageable with the sideframe and
a torsion spring secured, at its outer end, to the clamp, and at its inner end, to the outer end portion of an associated wing roller whereby said torsion springs provide the sole connection between the roller assembly and the sideframes,
each of said torsion springs being connected to the outer end of the clamp by a pivot pin having its axis parallel to the plane of the belt, and thereby at an angle with respect to the pivotal connection means between rollers,
said torsion spring being a leaf spring having a length dimension substantially longer than its width, and its width dimension substantially longer than its thickness,
said leaf spring being secured to the clamp with its width dimension oriented generally perpendicularly to the plane of the conveyor belt, and its length dimension at an acute angle with the associated sideframe upstream of the assembly.

References Cited in the file of this patent

UNITED STATES PATENTS

| | | |
|---|---|---|
| 1,787,786 | Jerome | Jan. 6, 1931 |
| 2,238,380 | Almen | Apr. 15, 1941 |
| 2,880,851 | Salmons | Apr. 7, 1959 |
| 2,892,534 | Ogden | June 30, 1959 |

FOREIGN PATENTS

| | | |
|---|---|---|
| 890,337 | France | Nov. 2, 1943 |